R. B. WARE.
CALIPER SQUARE.
APPLICATION FILED JAN. 20, 1908. RENEWED JUNE 15, 1909.
945,144.
Patented Jan. 4, 1910.
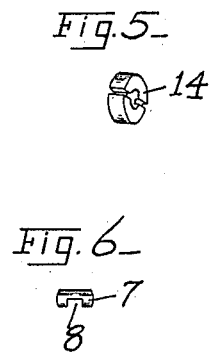
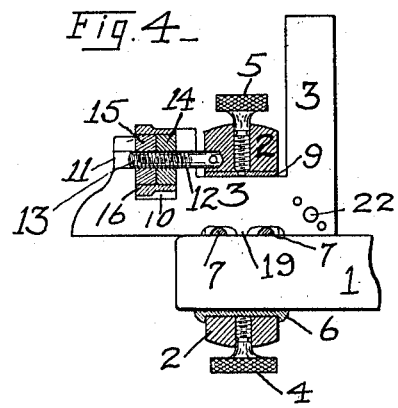
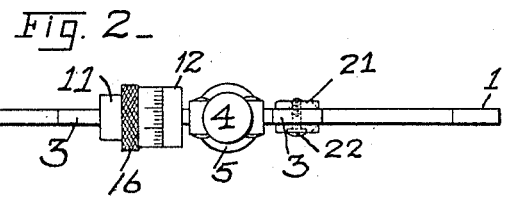
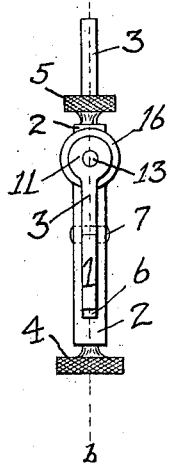
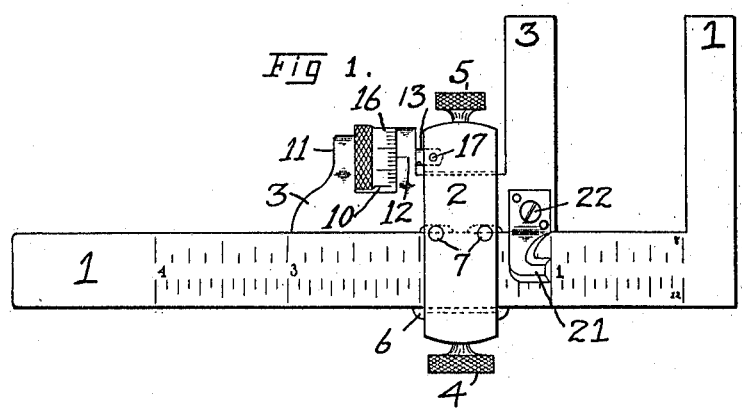
WITNESSES:
Marguerite Ross
Laura Le Roy,
INVENTOR
Rodney B. Ware
BY Edw. Vanlwinkle
ATTORNEY

UNITED STATES PATENT OFFICE.

RODNEY B. WARE, OF NEW YORK, N. Y.

CALIPER-SQUARE.

945,144.  Specification of Letters Patent.  Patented Jan. 4, 1910.

Application filed January 20, 1908, Serial No. 411,615. Renewed June 15, 1909. Serial No. 502,333.

*To all whom it may concern:*

Be it known that I, RODNEY B. WARE, a citizen of the United States, residing in the borough of Brooklyn, city, county, and State of New York, have invented certain new and useful Improvements in Caliper-Squares, of which the following is a specification, reference being had therein to the accompanying drawing.

This invention relates to an improvement in beam micrometer caliper squares, and more particularly to the details of the yoke and sliding jaw or blade of the caliper.

The object of the invention is to provide a caliper of large measuring capacity without increasing the length of beam and to provide a screw adjusting movable blade with but one yoke, and to produce a caliper without any threads exposed to collect dust.

The invention accordingly consists in the features of construction, combination of elements, and arrangement of parts, which will be exemplified in the mechanism hereinafter described and the scope of the application of which will be indicated in the claims.

The foregoing and other features of my invention will now be described in connection with the accompanying one sheet of drawings forming part of the specification, in which I have represented my caliper embodying the improvements in the preferred form, after which I shall point out in the claims those features which I believe to be new and of my own invention.

Referring to the accompanying drawing in which similar characters of reference indicate like parts throughout the several views, Figure 1 is a side elevation of my beam caliper square, Fig. 2 a top view thereof, Fig. 3 is an end view. Fig. 4 is a section through block. Figs. 5 and 6 are details which I employ.

Slidably mounted on beam 1 is the yoke 2 carrying the blade 3 which is characteristic of all micrometer caliper squares. Mounted in yoke 2 are two straddle pins 7 provided with notches 8, detail of which is shown in Fig. 6, forming a bearing surface against which the beam 1 is locked by set screw 4. Set screw 4 bears down against bushing 6 instead of directly against the beam, thereby saving the blade from wear and tear. The bushing is renewable, as will be readily understood. On upper end of the yoke 2 is a set screw 5 which bears against blade 3 through bushing 9 and locks the blade in its adjusted position. The blade 3 is provided with a notch 10 and bearings 11 and 12 in which is mounted on screw 13 the knurled micrometer ring 16 which is provided with a sectional adjustable nut to insure a perfect fit to screw 13. The screw 13 is fastened in yoke 2 by means of pin 17 and is carried by bearings 11 and 12.

Referring more particularly to Fig. 4 for details of the sectional adjustable nut it will be seen that the knurled micrometer ring has within it two threaded nuts 14 and 15. The nut 15 is pressed in the ring 16 and is a tight fit. The nut 14 is slotted on one end and is split clear through on one side as will be clearly seen by referring to Fig. 5. This nut is a wringing fit in the knurled ring and is pressed up close to the nut 15 and is turned in adjusted position by means of a screw driver to be placed in the slot across the end. The object of this nut is to serve as a tension, thereby securing the desired fit on the screw and also to provide a means to take up any lost motion due to the wear of the screw or nut. To make the complete nut fit snugly in the notch 10 both inside nuts are forced through the outside ring which provides a means for increasing the over-all length of the complete nut. The micrometer ring is provided with the usual scale which passes a mark on the stationary bearing 12. This feature is common to all micrometer tools and need not, therefore, be more minutely described. For the purpose of clearness I will define "wringing fit" as "a tight twist fit almost a driving fit." The blade 3 is notched so as to straddle the pins 7 and a projection 19 is provided which bears against the beam between the pins. This distributes the pressure on the blade and prevents the tendency to buckle when the thumb screw 5 is set down hard. On both sides of the blade 3 I provide an L-shaped indicator 21 fastened by means of screw 22 and pins as shown or by any other means. The object of this indicator is to provide a means for utilizing all four edges of the beam for graduations which may be in various scales, inches, millimeters, etc., as may be desired.

It will be noted that all threads are completely covered, which is most desirable in all instruments of precision. The unthreaded portions of the stem of the set screws fit into a counter-bored recess in the yoke. The remaining threaded portion being thus entirely inclosed to insure sufficient adjustment of screw without exposing its thread, as will be readily understood.

To set the tool, slide the blade to the approximate measurement and clamp the yoke to the beam by means of set screw 4. Then adjust the blade by means of the knurled micrometer ring and clamp to the adjusted position by means of set screw 5.

I am well aware that micrometer calipers have been placed on the market with two yokes, one of which carries the micrometer adjustment, but I know of no construction in which the blade carries the micrometer nurl and is movably mounted therein, and a single yoke. The latter feature provides an increased adjusting capacity over the old calipers now on the market, as will be readily seen by referring to Fig. 4, where in this position the ordinary adjusting yoke would be entirely off the beam.

I wish it distinctly understood that my caliper square herein illustrated and described, is in the form which I desire to construct it, and that any changes or variations may be made as may be convenient or desirable without departing from the salient features of my invention and I therefore intend the following claims to cover such modification as naturally fall within the lines of invention.

Having thus fully described my invention, what I claim as new and desire to secure by Letters Patent is,—

1. In a micrometer caliper square in combination, a graduated beam, a yoke slidably mounted thereon and provided with a screw fastened thereto, a notched blade provided with a micrometer ring containing a sectional nut adjustable to fit the aforementioned screw and notch and means contained in the yoke to clamp the blade in its adjusted position.

2. In a measuring instrument, a micrometer ring provided with a tight fitting nut against which is pressed a split nut.

3. In a micrometer caliper square, a graduated beam with sliding yoke and blade in combination with L-shaped runners one on each side of the blade providing for four sets of graduations on beam.

4. In a micrometer caliper square in combination, a graduated beam, a yoke slidably mounted thereon provided with a screw fastened thereto and pins adapted to straddle the beam, a notched blade which straddles the before-mentioned pins provided with a micrometer ring containing a sectional nut adjustable to fit the afore-mentioned screw and notch; a set screw in each end of the yoke, one bearing indirectly on the blade, the other bearing indirectly on the beam, whereby the blade may be fastened to the beam and the beam to the yoke through the pins.

5. In a caliper square a graduated beam and sliding blade in combination with a yoke provided with pins notched to straddle the blade, a set screw in the aforementioned yoke whereby the beam is clamped against the straddle pins.

6. In a caliper square in combination a graduated beam, a yoke provided with pins notched to straddle the beam, a sliding blade provided with notches which straddle the aforementioned pins.

This specification signed and witnessed this 15th day of January, A. D., 1908.

RODNEY B. WARE.

In presence of:—
 EDWD. VAN WINKLE,
 MARGUERITE ROSS.